United States Patent Office 3,450,660
Patented June 17, 1969

3,450,660
WATER-DISPERSIBLE, HEAT-HARDENING INTERPOLYMERS INCLUDING MONOMERIC TRANSESTERS OF ALKOXY ALKYLATED AMINOTRIAZINE WITH UNSATURATED ACID
Kazys Sekmakas, Chicago, Ill., assignor to De Soto, Inc., Chicago, Ill., a corporation of Delaware
No Drawing. Filed Feb. 25, 1966, Ser. No. 529,924
Int. Cl. C08f *15/40, 27/08;* C08g *37/32*
U.S. Cl. 260—29.4                           11 Claims

ABSTRACT OF THE DISCLOSURE

Non-gelled, heat-hardening interpolymers which are dispersible in water with the aid of a base are provided by interpolymerizing monomeric transesters such as those formed by transesterifying hexamethoxy methyl melamine with monobutyl maleate. The transester is interpolymerized with an unsaturated monomer containing the hydroxy group, such as hydroxyethyl acrylate, and ethylenic monomer providing the carboxyl group, such as acrylic acid, and a portion of ethylenic monomer free of functional groups such as acrylate esters with monohydric alcohols.

---

The present invention is related to the copending application of myself and Frank Ragas, Ser. No. 491,049, filed Sept. 28, 1965, now United States Patent 3,396,209, granted Aug. 6, 1968.

The present invention relates to water soluble thermosetting resins including resins which are particularly adapted to be applied by electrophoretic deposition methods.

In accordance with the present development, a water soluble alkoxy alkylated triazine derivative is reacted with a monoethylenically unsaturated monocarboxylic acid to provide a monoester which is copolymerized with other monoethylenically unsaturated monomers including monomers providing hydroxy functionality and monomers providing carboxy functionality in order to provide an interpolymer which can be dispersed in water with a volatile nitrogenous base such as ammonia or an amine and which, when filmed on a substrate and baked, will thermoset to provide coatings of good properties from aqueous medium. The invention particularly contemplates electrophoretic deposition in which the complete association between the alkoxy alkylated triazine and the unsaturated acid monomer prior to copolymerization insures complete incorporation of this component into the copolymer so that only a single resin phase is available for response to the electrophoretic force to thereby insure that the resin phase will deposit uniformly with no portions thereof building up in the aqueous system which is relied upon.

As pointed out in application Ser. No. 491,049, it is important to form a transester with the alkoxy alkylated triazine and not a polymer of the unsaturated acid which is reacted. Similarly, it is desired to form a copolymer of the transester with other monoethylenically unsaturated monomers so as to build an acrylic-type backbone into the copolymer instead of forming a homopolymer of the unsaturated transester which would have little utility in coating processes. Accordingly, the unsaturated acid which is selected is a monoester of maleic or fumaric acids which has little tendency toward homopolymerization. In this manner, homopolymerization of the unsaturated acid during transester formation and homopolymerization of the transester which is formed are largely eliminated.

Referring first to the alkoxy alkylated triazine, this will be exemplified by hexamethoxy methyl melamine. This starting material is subjected in accordance with the invention to very extensive modification and it must retain its solvent-soluble, non-gelled condition as well as the capacity to be brought into intimate association with water. Accordingly, the hexamethoxy methyl melamine should be essentially monomeric. Also, and for good water association, the alkylene group should be ethylene or methylene, the latter being strongly preferred and this group should be substantially completely tied up in ether form with ethanol or methanol, the latter, again, being strongly preferred.

While melamine has been referred to as a particularly preferred triazine, any polyamine and especially any triazine can be used so long as it is substantially completely alkoxy alkylated. Stated in different language, all aminotriazines can be used which contain at least two $NH_2$ groups, insofar as they can be converted into the corresponding methylol compounds with formaldehyde and subsequently etherified. For reasons of economy it is desirable to use the most easily accessible products such as melamine, and also N-phenyl-melamine, benzoguanamine, acetoguanamine, formoguanamine, ammeline, 2:4-diamino-6-chloro-1:3:5-triazine or the like.

It should be noted that the materials which are used in accordance with the invention should be substantially free of hydroxy and amide or amino groups since these tend to interfere with the reactions which are desired in accordance with the invention.

The unsaturated acid should be monoethylenically unsaturated and it must not be one which readily homopolymerizes. It is broadly possible to use maleic, fumaric, or itaconic acids, since these have little tendency to form homopolymers, but each molecule of acid is capable of bonding with two molecules of the melamine ether which increases molecular weight. Accordingly, in the preferred practice of the invention, the unsaturated acid which is selected is a half ester of maleic, fumaric, or itaconic acids. Any hydrocarbon radical may be used in the ester formation, but the preferred esters are formed with alcohols containing from 1–8 carbon atoms, most preferably ethyl alcohol and butyl alcohol.

As pointed out in application Ser. No. 491,049, transesterification is important because it has been found that the transesterification reaction can proceed with the production of volatile alcohol such as methanol to provide an essentially monomeric transester. In other words, the transesterification reaction is substantially preferential and condensation of the hexamethoxy methyl melamine during the reaction is substantially excluded.

It is also preferred to insure that all of the melamine starting material is available for copolymerization and that all of the copolymerizable monomer is copolymerized with the melamine component. This requires that the hexamethoxy methyl melamine and the unsaturated acid be reacted in substantially equimolar amounts (±20% provides the most preferred form of the invention), and the reaction should be carried through to completion in order that substantially all of the melamine component is in the form of an unsaturated ester and substantially all of the unsaturated acid is eliminated from the system. In this respect, completion of the reaction is easily noted by the substantial elimination of acidity and the reaction can therefore be followed either by following acid number or, and especially when experience with the reaction is obtained, by noting the amount of alcohol removed during the transesterification reaction.

Of course, one can still obtain some of the benefits of the invention by departing from the preferred proportions noted hereinbefore. Thus, one can broadly utilize a mol ratio as low as 0.5 equivalent of acid per mol of aminotriazine. Similarly, and at the sacrifice of some water solubility, one can use up to 0.5 equivalent of acid per equivalent of alkoxy group in said aminotriazine.

The transesterification step is preferably carried out under anhydrous conditions and preferably in the absence of inert solvents. An organic solvent medium may be employed if so desired, such as aromatic hydrocarbons or ketones. The transesterification reaction is carried out at a temperature ranging from 100° F. to 350° F. A preferred range is 200° F. to 280° F. Ordinarily, it is preferred to conduct the reaction under a reduced pressure (partial vacuum) in order to speed the removal of the volatile product of the transesterification (the alcohol corresponding to the alkoxy group).

The unsaturated melamine ester per se is a hard and brittle intermediate claimed in said application Ser. No. 491,049. Therefore, this ester is copolymerized with ethylenically unsaturated monomeric materials containing the $CH_2=C<$ group. By appropriately selecting the ratios of unsaturated vinyl or acrylic monomers, the resulting products may range from flexible types to very hard, brittle mar proof resinous materials. The ethylenically unsaturated monomers capable of copolymerizing with the triazine esters of the invention may be any one of a number of materials having a polymerizable $CH_2=C<$ group, such as vinyl toluene, styrene, ethyl acrylate, butyl acrylate, vinyl acetate, vinyl stearate, 2-ethylhexyl acrylate, and others well known to the art, especially in combinations of monomers producing hard polymers and monomers producing soft polymers.

The ethylenically unsaturated monomeric materials which are copolymerized with the unsaturated melamine ester must include materials providing hydroxyl groups. These are most usually available with the hydroxyl group being primary or secondary as illustrated by 2-hydroxy ethyl acrylate, 2-hydroxy propyl acrylate, 2-hydroxy propyl butyl maleate, 2-hydroxy ethyl methacrylate, 2-hydroxy propyl methacrylate, 2-hydroxy methyl-5-norbornene, allyl alcohol, methallyl alcohol, 2-hydroxy ethyl crotonate, 2, hydroxy propyl crotonate, and crotyl alcohol.

In the preferred practice of the invention, there is provided a stoichiometric excess of the total of hydroxy groups and carboxyl groups in the interpolymer, in comparison with the number of methoxy groups remaining in the melamine ester. This is because the hydroxy groups are far more rapidly reactive with the methoxy group than is the methoxy group reactive with itself. If any excess of methoxy is provided and remains unreacted during the cure it tends to decrease the water and chemical resistance of the cured product.

From the standpoint of weight proportions, the methoxy methyl triazine ester may be used in an amount of from 2–50% by weight of the final interpolymer, preferably in an amount of from 5–30%, on the same basis. These same weight proportions generally prevail with respect to the unsaturated hydroxy-providing component, so long as it is understood that the hydroxy component should be present in stoichiometric excess as previously indicated and so long as it is further understood that it is preferred that at least 20% of the interpolymer, preferably at least 30% of the interpolymer, be constituted by vinyl monomers carrying no functional groups in order to provide the desired physical properties and an appropriate cross-linked density.

It is also important that the interpolymer include a proportion of an ethylenically unsaturated material providing free carboxyl groups. These materials are illustrated by acrylic acid, methacrylic acid, crotonic acid, monobutyl maleate, itaconic acid, maleic acid, fumaric acid, and the like. Acrylic acid is especially preferred and methacrylic acid and crotonic acid are quite good. The remaining acids are of lesser value. These may be used in an amount of from 1–30% by weight of the interpolymer, preferably from 3–15% by weight. The purpose is to provide sufficient carboxyl functionality to enable association with a nitrogenous base in order to provide an affinity for water and enable the thermosetting interpolymers of the invention to be either dissolved or effectively dispersed in an aqueous medium.

The copolymerization reaction is a standard solution copolymerization conducted in an organic solvent in which the monomers and the polymer are soluble. From the standpoint of convenience, it is preferred to employ an organic solvent which is miscible with water since this facilitates subsequent association of the polymer in the desired aqueous medium. In this connection, any inert organic solvent which is miscible with water may be used, these being illustrated by methyl alcohol, ethyl alcohol, isopropyl alcohol, propyl alcohol, 2-ethoxy ethanol, 2-butoxy ethanol, 2-methoxy ethanol, acetone, etc.

Chain terminating agents, such as mercaptans, may be used to exert their known effect of lowered average molecular weight.

Any free-radical generating polymerization catalyst may be used, the selection of catalyst being determined by the desired temperature of the polymerization reaction. The important point is that the agent liberate free radicals under the conditions of polymerization so that the addition polymerization is facilitated. The class of catalysts under consideration is too well known to require extensive discussion, the examples illustrating suitable materials.

The specific nature of the nitrogenous base which is selected is not a primary feature of the invention. In selecting the volatile base, the base is desirably of sufficient volatility to vaporize so that at least a large portion of the base will leave the film which is deposited during the operation of drying the film. Ammonia is a preferred nitrogenous base, but other volatile bases such as volatile aliphatic amines may be employed and are preferred. Volatile aliphatic amines are illustrated by monomethyl amine, dimethyl amine, diethyl amine, triethyl amine and morpholine. While volatile nitrogenous bases are preferred, non-volatile bases may, less desirably, be used such as sodium and potassium which may be employed in the form of hydroxides or alkaline salts such as carbonates.

In some instances, and as an optional feature, it is helpful to include in the aqueous phase a small proportion of water soluble organic solvent which serves as a coupling agent to improve solution clarity and to enhance film flow upon subsequent application and baking. Appropriate water soluble organic solvents for this purpose are alcohols such as ethanol, glycols such as ethylene glycol, propylene glycol and butylene glycol, glycol ethers such as 2-ethoxy ethanol and 2-butoxy ethanol as well as esters of said glycol ethers such as the acetate thereof.

The invention is illustrated in the examples which follow.

EXAMPLE 1

Preparation of hexamethoxy-methyl melamine-maleic acid half ester adduct

Charge into reactor equipped with agitator, thermometer and connector to vacuum pump. Heat to 270° F. Hold for one hour. Cool to 240° F.:

Maleic anhydride (1 equivalent) _____grams__ 98
Butyl alcohol _____do____ 74

Add: Hexamethoxy methyl melamine (6 equivalents) _____grams__ 390

Theoretical acid value: 326.
Actual acid value: 323.
Set vacuum on and hold at 220–240° F. while distilling off methanol. Hold for acid value less than 20. Weight loss 45 grams.

Final characteristics of adduct

Viscosity (Gardner) _____ $Z_2$–$Z_3$
Color (Gardner-Holdt) _____ 2
Acid value _____ 13.6

EXAMPLE 2

Preparation of hydroxy-melamine polymer

The following example demonstrates the preparation of a water soluble hydroxy-melamine interpolymer, containing reactive methoxy groups in the polymer chain.

Charge into a reactor equipped with an agitator, thermometer, reflux condenser, addition funnel and nitrogen inlet tube. Heat to 190° F.:

Isopropanol _____parts by weight__ 400

Premix monomers, solvent and catalyst and add to reactor over two hour period. Hold for two hours at 190–195° F.:

Isopropanol _____parts by weight__ 100
Adduct of Example 1_____do____ 300
Isobutyl acrylate _____do____ 210
Hydroxy ethyl acrylate _____do____ 340
Acrylic acid _____do____ 50
Ethyl acrylate _____do____ 200
Benzoyl peroxide _____do____ 10

Add catalyst and hold for three hours to complete monomer conversion. Cool to 140° F.:

Benzoyl peroxide _____parts by weight__ 3

Add triethyl amine and water:

Triethyl amine _____do____ 57
Water (distilled) _____do____ 570

Final characteristics of polymer

Solids (percent) _____ 49.2
Viscosity (Gardner) _____ Q–R
Color (Gardner-Holdt) _____ 2

When used for electrophoretic deposition, add triethyl amine to adjust pH to 7.1–7.2. Add water to dilute to 10–20% solids. Ratio of water to isopropanol: 9 parts water to 1 part isopropanol.

EXAMPLE 3

Preparation of hydroxy polymer

The following example demonstrates the preparation of water soluble hydroxy polymers, containing no melamine in the polymer chain.

Charge into a reactor equipped with an agitator, thermometer, reflux condenser, addition funnel and nitrogen inlet tube. Heat to 190° F.:

Isopropanol _____parts by weight__ 400

Premix monomers, solvent and catalyst. Add to reactor over two hour period (190° F.) Hold for two hours at 190–195° F.:

Isopropanol _____parts by weight__ 100
Isobutyl acrylate _____do____ 210
Hydroxy ethyl acrylate _____do____ 340
Acrylic acid _____do____ 50
Ethyl acrylate _____do____ 200
Benzoyl peroxide _____do____ 10

Add catalyst and hold for 3 hours at 190° F. for complete conversion. Cool to 140° F.:

Benzoyl peroxide _____parts by weight__ 3

Add triethyl amine and water:

Triethyl amine _____parts by weight__ 57
Water (distilled) _____do____ 570

Final characteristics of polymer

Solids (percent) _____ 41.7
Viscosity (Gardner) _____ C
Color (Gardner-Holdt) _____ 1

Add triethyl amine to adjust pH to 7.2. Add water to dilute to 10–20% solids, when used for electrophoretic deposition.

EXAMPLE 4

A water soluble acrylic-hydroxy-melamine interpolymer is prepared having the following ratios of reactive groups:

Hydroxy equivalents _____ 2.9
Methoxy equivalents _____ 3.0
Carboxy equivalents _____ 0.69

Heat to 190° F.:

Isopropanol _____parts by weight__ 400

Premix and add to reactor over 2 hours at 190–195° F. Hold for two hours:

Adduct of Example 1_____parts by weight__ 300
Ethyl acrylate _____do____ 410
2-hydroxy ethyl acrylate_____do____ 340
Acrylic acid _____do____ 50
Isopropanol _____do____ 100
Benzoyl peroxide _____do____ 10

Add catalyst and hold for complete monomer conversion:

Benzoyl peroxide _____parts by weight__ 3

Cool to 140° F., and add:

Triethyl amine _____do____ 57
Water (distilled) _____do____ 570

Final characteristics

Solids (percent) _____ 49.1
Viscosity (Gardner) _____ T–U
Color (Gardner) _____ 1–2

The interpolymer is diluted to 10% resin solids using distilled water and exhibits excellent electrophoretic deposition properties.

Evaluation of water-soluble hydroxy polymers for use in electrophoretic coatings The resin is reduced to 10% solids using water. The pH is adjusted to 7.1 using triethyl amine. The resin solution is charged into a glass beaker equipped with a magnetic stirrer. Two black iron panels are immersed into the resin solution. Resin film is deposited using 2 milliampere current per each square centimeter. During the deposition, the voltage is increased gradually in order to keep constant amperage. The equipment used is described in detail in Electrodeposition: Theory and Practice, Official Digest, February 1965, pp. 114–115.

Total deposition time: 130 seconds
Thickness of deposited film: 0.8 mil
Characteristics of film: smooth and even

| | Hydroxy-Melamine Interpolymer of Example 2 | Hydroxy Polymer of Example 3 (Containing no Melamine) | Hydroxy Polymer of Example 3 Cold Blended with hexamethoxy methyl melamine in an amount providing the same ratio of melamine to hydroxy as used in Example 4 |
|---|---|---|---|
| Film deposition properties | Very good | Very good | Very good. |
| Baking time | 20 minutes | 20 minutes | 20 minutes. |
| Temperature | 350° F | 350° F | 350° F. |
| Toluol Resistance | Excellent | Very poor (film dissolves) | Poor. |
| Sodium Hydroxide (1% Solution) | Pass 24 hour immersion test | Film removed in 5 minutes | Film removed in 15 minutes. |
| Dry Film Thickness (mils) | 0.82 | 0.86 | 0.9. |

The invention is defined in the claims which follow.

I claim:
1. A non-gelled, heat-hardening interpolymer adapted to be dispersed or dissolved in water with a base and comprising interpolymerized units of:
   (A) from 2–50% by weight of an essentially monomeric transester of substantially completely alkoxy alkylated aminotriazine containing at least two $NH_2$ groups with monoethylenically unsaturated carboxylic acid from the group of maleic acid, fumaric acid, itaconic acid, and half esters thereof with monohydric alcohols, the alkoxy and alkylene groups of said alkoxy alkylated aminotriazine each containing 1 or 2 carbon atoms;
   (B) from 2–50% by weight of ethylenically unsaturated monomer providing the hydroxyl group;
   (C) from 1–30% by weight of ethylenically unsaturated monomer providing the carboxyl group; and
   (D) at least 20% by weight of ethylenically unsaturated material containing the $CH_2{=}C{<}$ group and otherwise free of functional groups.

2. An interpolymer as recited in claim 1 in which said alkoxy alkylated aminotriazine is hexamethoxy methyl melamine.

3. An interpolymer as recited in claim 1 in which said monomeric transester is provided by reacting one molar proportion of said acid per mole of said aminotriazine to provide a monoester.

4. An interpolymer as recited in claim 3 in which said acid is a monoester of dicarboxylic acid selected from the group consisting of maleic acid and fumaric acid with a monohydric alcohol containing from 1–8 carbon atoms.

5. An interpolymer as recited in claim 1 in which said ethylenically unsaturated monomer providing hydroxy groups is selected from the group consisting of 2-hydroxy ethyl acrylate, 2-hydroxy propyl acrylate, 2-hydroxy propyl butyl maleate, 2-hydroxy ethyl methacrylate, 2-hydroxy propyl methacrylate, 2-hydroxy methyl-5-norbornene, allyl alcohol, methallyl alcohol, 2-hydroxy ethyl crotonate, 2-hydroxy propyl crotonate, and crotyl alcohol.

6. An interpolymer as recited in claim 1 in which said ethylenically unsaturated monomer providing the carboxyl group is selected from the group consisting of acrylic acid, methacrylic acid and crotonic acid.

7. An interpolymer as recited in claim 1 in which the total of the hydroxyl groups and the carboxyl groups contained therein are in stoichiometric excess with respect to the alkoxyalkyl groups in said ester.

8. An interpolymer as recited in claim 1 in which said polymer is provided in solution in a water-miscible organic solvent.

9. A non-gelled, heat-hardening interpolymer adapted to be dispersed or dissolved in water with a base and comprising interpolymerized units of:
   (A) from 2–50% by weight of an essentially monomeric mono transester of substantially completely methoxy methylated aminotriazine containing at least two $NH_2$ groups with a half ester of an acid from the group of maleic acid, fumaric acid, and itaconic acid with monohydric alcohols;
   (B) from 2–50% by weight of ethylenically unsaturated monomer providing the hydroxyl group;
   (C) from 1–30% by weight of ethylenically unsaturated acid from the group of acrylic acid, methacrylic acid and crotonic acid; and
   (D) at least 20% by weight of ethylenically unsaturated material containing the $CH_2{=}C{<}$ group and otherwise free of functional groups.

10. An aqueous medium having dispersed or dissolved therein with the aid of a base, the polymer of claim 1.

11. An aqueous medium as recited in claim 10 in which said aqueous medium comprises water-soluble organic solvent.

References Cited
UNITED STATES PATENTS

| | | | |
|---|---|---|---|
| 2,829,119 | 4/1958 | Dudley | 260—67.6 |
| 2,871,209 | 1/1959 | Shelley | 260—67.6 |
| 2,885,382 | 5/1959 | Zuppinger et al. | 260—67.6 |
| 2,986,541 | 5/1961 | Zuppinger et al. | 260—67.6 |
| 3,018,265 | 1/1962 | Tessmar | 260—856 |
| 3,258,339 | 6/1966 | Adams | 260—29.4 |
| 3,298,978 | 1/1967 | Rutherford | 260—856 |

SAMUEL H. BLECH, *Primary Examiner.*

JOHN C. BLEUTGE, *Assistant Examiner.*

U.S. Cl. X.R.

117—161; 204—181; 260—32.8, 33.2, 33.4, 67.6, 78.5, 80.72, 856